United States Patent
Bernstein

(10) Patent No.: US 9,194,384 B2
(45) Date of Patent: Nov. 24, 2015

(54) MEMS ELECTROSTATIC FLUIDIC PUMPS AND VALVES

(75) Inventor: Jonathan J. Bernstein, Medfield, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 709 days.

(21) Appl. No.: 12/971,654

(22) Filed: Dec. 17, 2010

(65) Prior Publication Data

US 2011/0150667 A1  Jun. 23, 2011

Related U.S. Application Data

(60) Provisional application No. 61/287,362, filed on Dec. 17, 2009.

(51) Int. Cl.
| | |
|---|---|
| *F04B 9/10* | (2006.01) |
| *F04B 19/00* | (2006.01) |
| *B01L 3/00* | (2006.01) |
| *F16K 99/00* | (2006.01) |

(52) U.S. Cl.
CPC .............. *F04B 19/006* (2013.01); *B01L 3/5027* (2013.01); *F04B 9/10* (2013.01); *F16K 99/0001* (2013.01); *F16K 99/0017* (2013.01); *F16K 99/0051* (2013.01); *F16K 2099/0094* (2013.01)

(58) Field of Classification Search
CPC ..................... F04B 19/006; B01J 2219/00367; B01J 2219/00369; B01J 2219/00371; B01L 3/5027; B01L 3/50273; B01L 3/502784; B01L 2200/06; B01L 2200/0605; B01L 2200/061; B01L 2219/00353; B01L 2400/0406; B01L 2400/046; B01L 2400/0475; B01L 2400/0487
USPC .............. 417/50, 53; 436/180; 422/68.1, 502, 422/504, 505
See application file for complete search history.

(56) References Cited

U.S. PATENT DOCUMENTS

| | | | | |
|---|---|---|---|---|
| 6,318,970 | B1 * | 11/2001 | Backhouse | 417/92 |
| 6,458,600 | B1 * | 10/2002 | Mirsky et al. | 436/518 |
| 2006/0165565 | A1 * | 7/2006 | Ermakov | 422/130 |
| 2006/0254933 | A1 * | 11/2006 | Adachi et al. | 205/777 |

OTHER PUBLICATIONS

H.J.J. Verheijen and M.W. J. Prins, "Reversible Electrowetting and Trapping of Charge: Model and Experiments", Langmuir 1999, 15, pp. 6616-6620.
J. Christopher Love, Lara A. Estroff, Jennah K. Kriebel, Ralph G. Nuzzo, and George M. Whitesides, "Self-Assembled Monolayers of Thiolates on Metals as a Form of Nanotechnology", Chem. Rev. 2005, 105, pp. 1103-1169.

(Continued)

*Primary Examiner* — Charles Freay
*Assistant Examiner* — Patrick Hamo
(74) *Attorney, Agent, or Firm* — Edward A. Gordon; Foley & Lardner LLP

(57) ABSTRACT

In various embodiments, a pump is provided that includes a microfluidic channel and a plurality of electrodes for electrostatically translating a target fluid along the channel from an inlet to an outlet. In other embodiments, a valve includes a microfluidic channel, a reservoir in fluidic communication with the channel, and an electrode for electrostatically drawing a fluid from the reservoir into the channel so as to block the flow of other fluids through the channel.

22 Claims, 7 Drawing Sheets

(56) References Cited

OTHER PUBLICATIONS

J. Gong and C.J. Kim, "Direct-Referencing Two-Dimensional Array Digital Microfluidics Using Multilayer Printed Circuit Board" JMEMS, vol. 17, No. 2, Apr. 2008 pp. 257-264.
S. Hardt and F. Schonfeld "Microfluidic Technologies for Miniaturized Analysis Systems", ,eds., Chapter 5, Electrowetting: Thermodynamic Foundation and Application to Microdevices, pp. 228-233.
Pei et al., "Light-Actuated Digital Microfluidics for Large-Scale, Parallel Manipulation of Arbitrarily Sized Droplets," University of California, Berkeley, 4 pages.
Chiou et al, "Light Actuation of Liquid by Optoelectrowetting," Sensors and Actuators A104, 2003, pp. 222-228.
Chiou et al., "Continuous Opteolectrowetting for Picoliter Droplet Manipulation," Applied Physics Letter 93, 221110, 2008, 3 pages.
Kim, "Micropumping by Electrowetting," ASME, Nov. 2001, 8 pages.

\* cited by examiner

MEMS ELECTROSTATIC FLUIDIC PUMPS AND VALVES

CROSS-REFERENCE TO RELATED APPLICATION

This application claims priority to and the benefit of, and incorporates herein by reference in its entirety, U.S. Provisional Patent Application No. 61/287,362, which was filed on Dec. 17, 2009.

TECHNICAL FIELD

In various embodiments, the present invention relates to micro-electro-mechanical systems ("MEMS") electrostatic fluidic pumps and valves.

BACKGROUND

A variety of different pumps may be employed to pump fluids. For example, diaphragm pumps (which typically include an oscillating membrane together with valves), Knudsen pumps, getter and sputter pumps, roots blowers, and turbo pumps may be employed for this purpose.

For a variety of reasons, however, these exemplary pumps suffer from shortcomings that render them unsuitable or undesirable for MEMS. More specifically, diaphragm pumps typically require mechanical valves, which are difficult to fabricate in a MEMS process. Knudsen pumps generally use a thermal gradient to pump gases, and require high power to operate. For their part, getter and sputter pumps typically use a consumable reactive electrode. When this electrode is used up, the pump stops working. Finally, roots blowers and turbo pumps are not yet capable of being fabricated by MEMS technology.

Fluidic valves for use in MEMS devices suffer from many of the same problems. For example, these valves may include moving parts that are difficult to fabricate and/or wear out over time. MEMS fluidic valves may also experience backflow or leakage issues.

Accordingly, there is a need for improved MEMS pumps and valves that consume low power, are simple to operate, have few or no moving mechanical parts, provide precisely controllable pumping rates (in the case of a MEMS pump), and have no backflow or leakage path.

SUMMARY OF THE INVENTION

In various embodiments, the present invention features microfluidic pumps and valves that operate through principles of electro-wetting, in which one or more electrodes are charged to attract a working fluid within the pump or valve. In certain embodiments, the charged electrodes cause the working fluid to form bands within a microfluidic channel. The bands of working fluid may be manipulated to pump a target fluid through the channel in a manner resembling a peristaltic pump. In other embodiments, a band may simply block the channel to prevent flow of the target fluid through the channel.

Advantages of the microfluidic pumps and valves described herein include low power consumption, simple operation, no backflow or leakage paths, and fluidic moving parts that do not wear out over time. In the case of the microfluidic pumps, additional advantages include high driving pressure and precisely controllable flowrates.

From a commercial perspective, various embodiments of the microfluidic pumps and valves described herein may be employed as sampling pumps for micro-analytic systems, as micro-roughing pumps for high vacuum systems, and/or as ultra small, low power pumps for portable analytic equipment (such as a mass spectrometer). Embodiments of the invention may also serve as pump and valve components for an integrated microfluidic system that includes sampling, pumping, and valving functions.

In general, in one aspect, embodiments of the invention feature a pump. The pump includes a microfluidic channel extending between a fluid inlet and a fluid outlet, and a plurality of electrodes for electrostatically translating a target fluid (e.g., a gas), trapped between bands of a working fluid, along the channel from the fluid inlet to the fluid outlet.

In general, in another aspect, embodiments of the invention feature a method of translating a target fluid (e.g., a gas) along a microfluidic channel extending between a fluid inlet and a fluid outlet. The method includes sequentially actuating a set of electrodes in proximity to the microfluidic channel, thereby electrostatically translating bands of a working fluid and target fluid trapped therebetween from the fluid inlet to the fluid outlet.

In various embodiments, at least one of the electrodes is a light-actuated virtual electrode, which is actuated by illuminating a photosensitive layer with light. In certain embodiments, a dielectric layer and/or a thiol-terminated molecule are disposed upon one or more of the electrodes. The working fluid may be conductive, dielectric, or an oil. In some embodiments, one or more of the electrodes comprises a surface chemistry that attracts the working fluid (e.g., the working fluid wets the electrode) when the electrode is charged and that repels the working fluid when the electrode is uncharged.

In addition, the microfluidic channel may be in fluidic communication with a reservoir for the working fluid. The reservoir may include a reservoir electrode, and may be disposed around a periphery of the plurality of electrodes.

In general, in yet another aspect, embodiments of the invention feature a valve. The valve includes a microfluidic channel, a reservoir in fluidic communication with the channel, and an electrode for electrostatically drawing, when actuated, a fluid (e.g., an oil) from the reservoir into the channel so as block the flow of other fluids through the channel.

In general, in still another aspect, embodiments of the invention feature a method of occluding flow in a microfluidic channel having a reservoir in fluidic communication therewith. The method includes actuating at least one electrode in proximity to the microfluidic channel, thereby electrostatically drawing a fluid (e.g., an oil) from the reservoir into the channel so as block the flow of other fluids through the channel.

In various embodiments, the electrode is a light-actuated virtual electrode, which is actuated by illuminating a photosensitive layer with light. An oleophobic layer may be disposed upon the electrode.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

In the following description, various embodiments of the present invention are described with reference to the following drawings, in which.

DESCRIPTION

Various embodiments of the present invention feature a MEMS electrostatic fluidic pump for pumping or sampling a target fluid, such as a gas. In certain embodiments, the pump utilizes a working fluid, such as a conductive liquid or a dielectric liquid, to transport the target fluid through the pump. For example, electrodes within the pump may be actuated to form bands of a working fluid that entrap the target fluid. The bands and the target fluid are then translated through the pump by sequentially actuating electrodes within the pump. In some embodiments, the working fluid is a pump oil and the target fluid is air. As further described below, the electrostatic fluidic device may also be employed as a MEMS fluidic valve or as a MEMS metering pump.

Using metal electrodes covered with a thin layer of a hydrophobic dielectric, conductive droplets (i.e., a working fluid), such as water droplets, may be moved towards charged electrodes and repelled from uncharged electrodes. In effect, the droplets wet the surface when a charge is applied to the electrode, and de-wet the surface when the charge is removed. This motion of the fluid droplets on dielectric coated electrodes is known as electro-wetting on dielectric ("EWOD").

While the EWOD principle works with conducting or electrolytic fluids, it also works with common pump oils, which are dielectrics, in a process herein referred to as electro-wetting of dielectric fluid ("EWODF"). With the EWODF approach, the metal electrodes do not require a dielectric coating because the dielectric fluid may directly support the electrode voltage drop, without electrolysis.

Water, alcohols, and other high dielectric constant fluids are considered to be conductive because they almost always absorb ions or dissolve gases from the environment, thereby becoming conductive. Water and common alcohols are also subject to electrolysis and become conductive at voltages greater than the equilibrium voltage for electrolysis (e.g., 1.23 volts for water).

Figure 1:
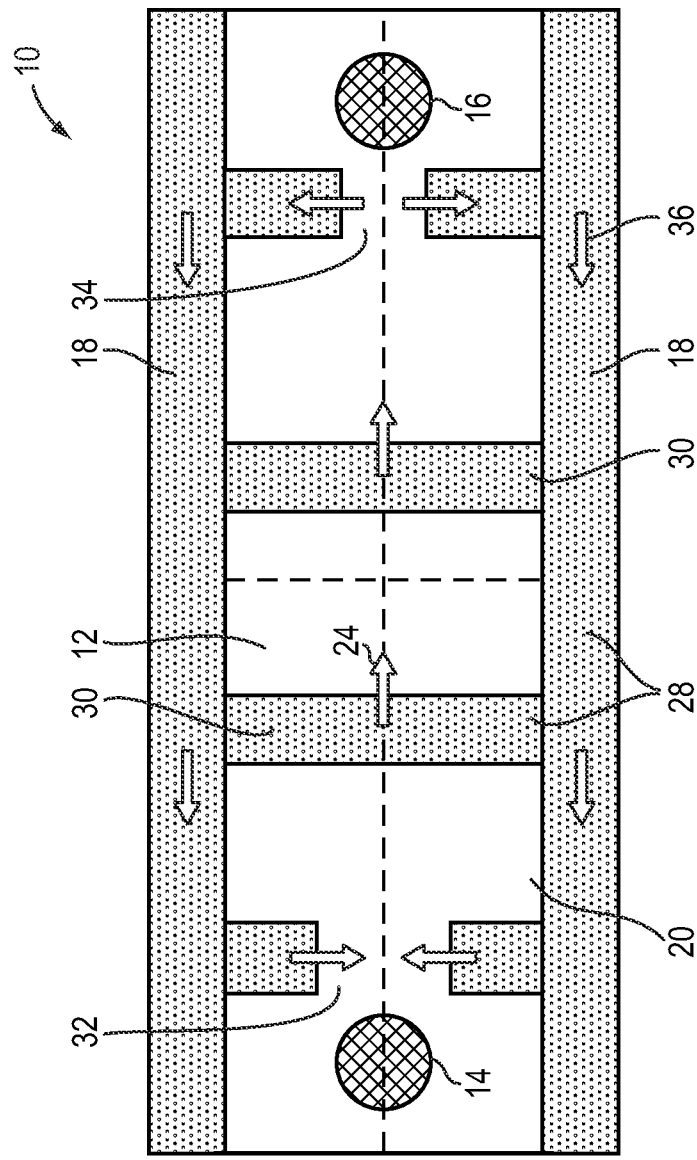
FIG. 1 is a schematic top view of a MEMS electrostatic pump, in accordance with one embodiment of the invention.

Referring to FIG. 1, in one embodiment, the EWOD and/or EWODF principles are employed to create a MEMS electrostatic fluidic pump 10 with no moving mechanical parts and no backward leakage paths. The pump 10 includes a MEMS microfluidic channel 12, an inlet 14, an outlet 16, and liquid reservoirs 18. A target fluid 20 (i.e., the fluid to be pumped by the pump 10) enters the channel 12 at the inlet 14, is pumped through the channel 12 in a pumping direction 24, and exits the channel 12 at the outlet 16. The reservoirs 18, on opposite sides of the channel 12, contain a working fluid 28. Bands 30 of the working fluid 28 span the distance between the reservoirs 18 (i.e., the width of the channel 12).

During operation of the pump 10, the target fluid 20 is pumped through the channel 12 using the bands 30. Specifically, the bands 30 are formed at a band formation location 32 near the inlet 14, translated through the channel 12 in the pumping direction 24, and destroyed at a band destruction location 34 near the outlet 16. The bands 30 may be formed at the band formation location 32 through electro-wetting by applying a charge to an electrode at that location. Upon formation of a new band 30, target fluid 20 may become entrapped between the newly formed band 30 and an adjacent, previously formed band 30. The entrapped target fluid 20 is moved through the channel 12 by translating the two bands 30 in the pumping direction 24.

In one embodiment, the bands 30 and the entrapped target fluid 20 are moved through the channel 12 by sequential actuation of a series of electrodes disposed along the channel 12. For example, to move a band 30 from a first electrode to an adjacent second electrode, the second electrode is actuated or charged and the first electrode is discharged. Advancing the charge from the first electrode to the second electrode causes the band 30 to advance, via electro-wetting, from the first electrode to the second electrode. This process of charging and discharging electrodes in sequence is repeated until the band 30 reaches the destruction location 34, where the band 30 is destroyed by discharging an electrode in that location. The working fluid 28 from the destroyed band 30 returns to the reservoirs 18 where it flows in a return direction 36 back to the formation location 32. Destruction of the band 30 allows the target fluid 20, which is no longer entrapped, to exit the channel 12 through the outlet 16.

Figure 2A:
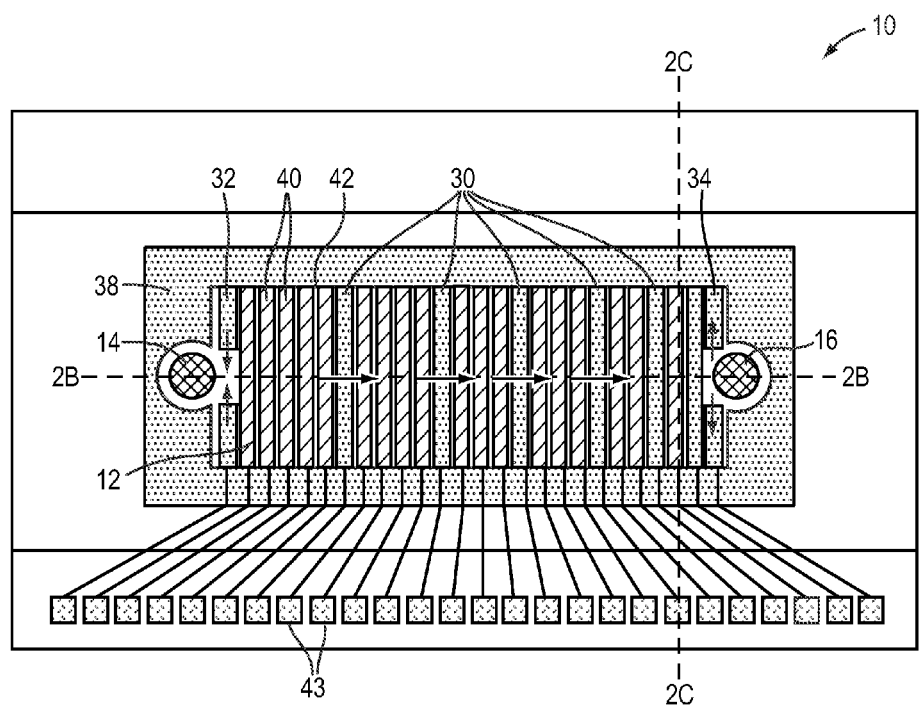
FIG. 2a is a schematic top view of a MEMS electrostatic fluidic pump, in accordance with one embodiment of the invention.

Referring to FIG. 2a, the channel 12 may include a series or array of actuation electrodes 40 that span the width of the channel 12 and are separated by thin gaps or strips 42. The actuation electrodes 40 may be lithographically defined. Bands 30 of working fluid 28 are formed at the band formation location 32 by charging an actuation electrode 40 at that location. The bands 30 are moved through the channel 12 by sequentially charging and discharging the actuation electrodes 40. Finally, the bands 30 are destroyed at the destruction location 34, where the working fluid 28 returns to a reservoir 38, which surrounds the channel 12. In one embodiment, the pump 10 includes electrical contacts 43 where voltages may be applied to charge one or more of the actuation electrodes 40.

As depicted in FIG. 2a, when the target fluid 20 is compressible, the bands 30 may be used to compress the target fluid 20 as it travels from the inlet 14 to the outlet 16. Specifically, by decreasing the spacing between the bands 30 as they travel through the channel 12, the entrapped pockets of target fluid 20 become compressed into smaller volumes. The band spacing may be decreased by, for example, decelerating the bands 30 as they travel through the channel 12. While the depicted compression ratio is about 5:1, the compression ratio may be increased or decreased by changing the initial and/or final spacing between the bands 30.

Figure 2B:
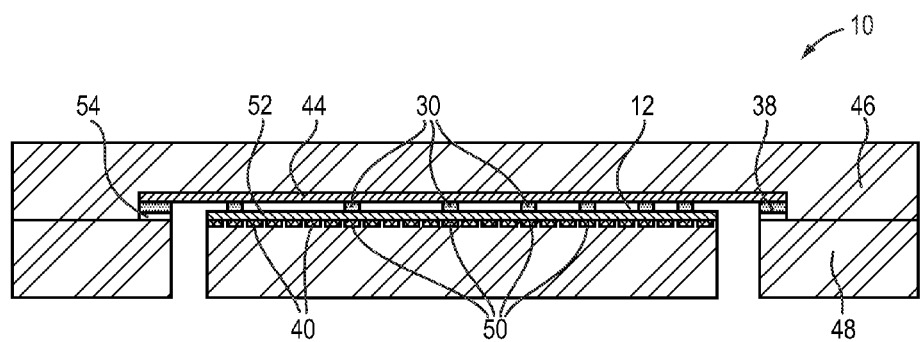
FIG. 2b is a schematic cross-sectional side view of a MEMS electrostatic fluidic pump taken along line labeled "2B'" of FIG. 2a, in accordance with one embodiment of the invention.
Figure 2C:
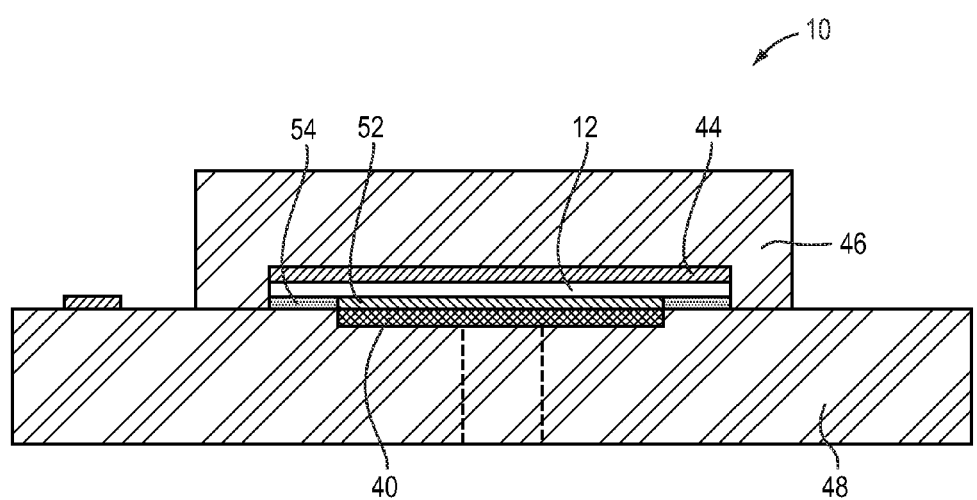
FIG. 2c is a schematic cross-sectional end view of a MEMS electrostatic fluidic pump taken along line labeled "2C'" of FIG. 2a, in accordance with one embodiment of the invention.

Referring to FIGS. 2b and 2c, the actuation electrodes 40 are, in one embodiment, separated from a ground electrode 44 by a uniform height of the channel 12. The ground electrode 44 and the actuation electrodes 40 may be housed within a cap 46 attached to a substrate 48. As depicted, when actuation electrodes 40 are charged at charge locations 50, bands 30 of working fluid 28 fill the height of the channel 12 over the charged actuation electrodes 40.

In the depicted embodiment, the height of the channel 12 (i.e., the distance between the actuation electrodes 40 and the ground electrode 44) is between about 0.1 μm and about 10 μm, the width of the channel 12 is between about 5 μm and about 500 μm, and the length of the channel 12 (i.e., the distance between the inlet 14 and the outlet 16) is between about 50 μm and about 2000 μm. For example, the channel 12 may have a height of about 0.5 μm, a width of about 50 μm, and a length of about 500 μm.

Depending on the type of working fluid 28 to be used, the actuation electrodes 40 and/or ground electrode 44 may include an electrode coating 52. For example, when the working fluid 28 is a conductive liquid, the electrode coating 52 may be a dielectric coating, such as aluminum oxide, titanium dioxide, glass, silicon dioxide, TEFLON®, or CYTOP®. By contrast, when the working fluid 28 is a dielectric liquid, the electrode coating 52 may be an oleophobic coating, such as a thiol-terminated polar organic molecule, where the thiol group binds strongly to a gold electrode, and the organic molecule is polar and therefore oleophobic. Other coatings will typically consist of an adhesion end (e.g., a thiol or silane group) and an oleophobic end (e.g., ionic groups such as alcohols or carboxylic acids). Other examples of hydrophilic (oleophobic) surface coatings are polyvinyl alcohol, $Al_2O_3$, $TiO_2$, glass, and $SiO_2$ deposited by PECVD (Plasma Enhanced Chemical Vapor Deposition) or ALD (Atomic Layer Deposition). In each case, the electrode coating 52 is chosen so that the EWOD or EWODF principle may be employed to wet and de-wet the actuation electrodes 40, as needed. In one embodiment, when thin Cr/Au actuation electrodes 40 are used, well established surface chemistry can be used to attach thiol-terminated molecules (e.g., dodecane thiol or hexadecane thiol) to the gold. By using these extremely stable linker surface chemistries to apply oleophilic coatings, an oil-based working fluid 28 will wet a coated gold electrode surface at all times, but wet the bare gold surface only when a suitable voltage is applied.

Similarly, to ensure that the working fluid 28 is attracted to and wets the reservoir 38, the reservoir 38 may include a reservoir coating 54. As with the electrode coating 52, the type of reservoir coating 54 to be used depends on the type of working fluid 28. For example, the reservoir coating 54 may be hydrophilic when the working fluid 28 is a conductive liquid, and the reservoir coating 54 may be oleophilic when the working fluid 28 is a dielectric liquid. Examples of suitable oleophilic reservoir coating materials include TEFLON®, CYTOP®, dodecane thiol, and hexadecane thiol. In one embodiment, ordinary dodecanethiol forms a self-assembled monolayer ("SAM"), which is oleophilic, and serves as an oleophilic reservoir coating 54 around the periphery of the pump 10. The SAM layer can be selectively removed from the actuation electrodes 40 by applying a negative voltage in water or by exposure of selected regions to oxygen plasma. In addition, many common polymers (e.g., polyethylene and polypropylene) are oleophilic and a thin layer of these polymers may be used to form an oleophilic reservoir coating. Alternatively, rather than or in addition to including the reservoir coating 54, the reservoir 38 may include an electrode that is charged to attract the working fluid 28, as needed.

In certain embodiments, the actuation electrodes 40 and ground electrode 44 are made of conductive materials. For example, the electrodes may be made of metals, including an adhesion layer (e.g., Cr, Ti, or Ta) and may include a second metal layer (e.g., Au, Cu, Ni, Pt, or Ag), doped polysilicon or conductive polymers such as poly-pyrrole, poly-aniline, poly-acetylene, or polythiophene, or conductive carbons such as amorphous or glassy carbon, pyrolytic graphite, or graphene.

Various types of working fluids 28 may be used with the pump 10. For example, the working fluid may be a conductive liquid (for EWOD) or a dielectric liquid (for EWODF). Examples of possible conductive working fluids include water, long chain alcohols, ethylene glycol, triacetin, di-octyl phthalate, tri-ethyl citrate, or 2-nonanone. Examples of dielectric working fluids that may be used include silicone oil, KRYTOX®, FOMBLIN®, and various fluorinated liquids (e.g., the 3M FLUORINERT™ family). In one embodiment, the working fluid is a pump oil such as KRYTOX®. As mentioned, when dielectric working fluids such as pump oil are used, the voltage drop between the actuating electrodes 40 and the ground electrode 44 is over the working fluid 28 itself, and dielectric layers or coatings on the electrodes may not be needed.

To avoid cavitation and facilitate flow of the working fluid 28 through the pump 10, it is generally desirable to use a working fluid 28 that has a relatively low vapor pressure and a relatively low viscosity. A vapor pressure less than about 5 mTorr and a kinematic viscosity less than about 200 cSt are suitable for many applications. Water, which has a relatively high vapor pressure, may not be suitable as a working fluid 28 for applications below about 20 mTorr. Alternative polar, conductive fluids, such as triacetin, di-octyl phthalate, tri-ethyl-citrate, or 2-nonanone, may be used instead of water for low pressure applications. A low viscosity may enable a more rapid movement (i.e., higher flowrate) of the bands 30 through the pump 10.

In various embodiments, a voltage-driven difference in surface tension drives the pump 10. To pump against a given differential pressure, a certain voltage is required. For an EWOD pump, the thickness and dielectric constant of the dielectric layer (e.g., electrode coating 52) define the relationship between the pressure and the required voltage. For an EWODF pump, because there is generally no extra dielectric layer, the thickness and dielectric constant of the working fluid define the relationship between the pressure and the voltage.

For a roughing pump operating against atmospheric pressure, it is assumed that the total pressure drop along the channel 12 is divided among all of the bands 30 within the channel 12. For example, in the case of a 5-band pump, the pump 10 may need about a 0.2 atmosphere capability at each band 30.

The pressure differential, $P_{EWOD}$, between a driven and un-driven electrode achieved at voltage V by an EWOD pump is given by:

$$P_{EWOD} = \frac{2}{9} \frac{\varepsilon_0 \varepsilon_{film}}{dt} V^2$$

where $\varepsilon_0$ is the dielectric constant of a vacuum, $\varepsilon_{film}$ is the relative dielectric constant of the thin dielectric layer, t is the thickness of the dielectric, and d is the fluid channel height. This equation indicates that an EWOD pump with a 260 nm thick Parylene C dielectric requires 26 V to achieve a pressure of 0.2 atmospheres. In other words, when the actuation electrode voltage is 26 V, a band 30 of working fluid is capable of achieving about 0.2 atmospheres of pumping pressure.

In contrast, the pressure, $P_{EWODF}$, for an EWODF dielectric fluid pump with relative dielectric constant $\varepsilon_{liq}$ is given by:

$$P_{EWODF} = \frac{\varepsilon_0 \varepsilon_{liq}}{2 \cdot d^2} V^2$$

Figure 3:
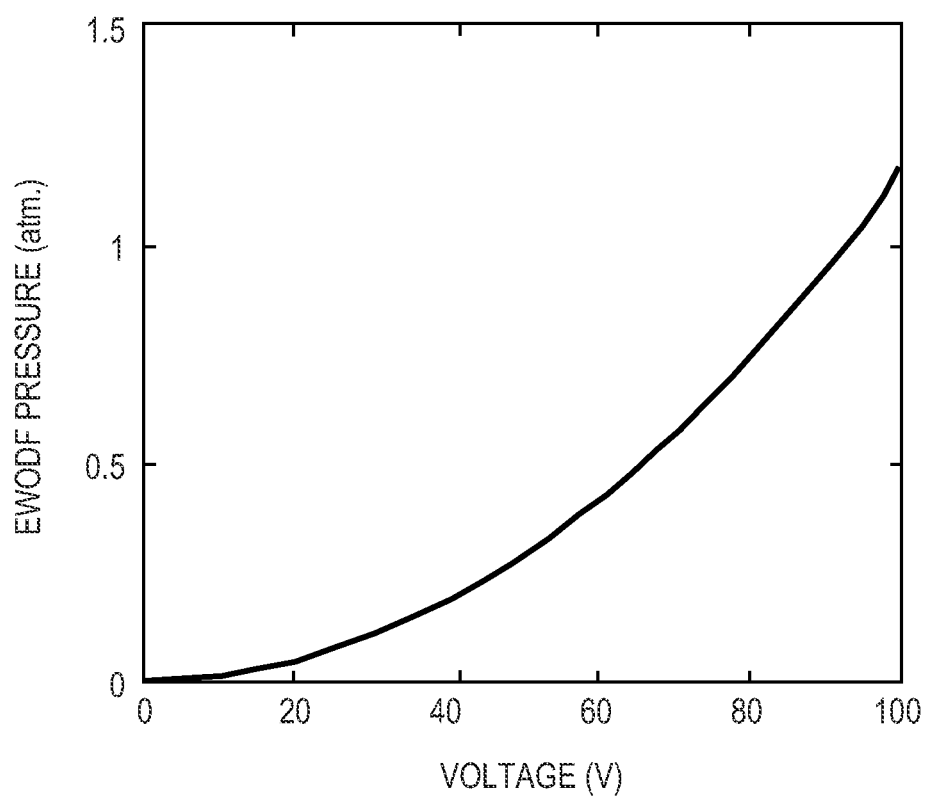
FIG. 3 is a plot of electro-wetting on dielectric fluid pressure versus voltage, in accordance with one embodiment of the invention.

Referring to FIG. 3, assuming the channel height is 1 micron and the working fluid 28 is a silicone oil pump fluid with a relative dielectric constant $\varepsilon_{liq}$ of 2.7, 0.2 atmospheres of pressure requires a voltage of 42 V. As the above equation indicates, higher dielectric constant fluids allow lower voltages to be used.

Table 1, below, summarizes the parameters used to calculate the EWOD pump energy consumption. To calculate the pump energy, the electrostatic energy, $\frac{1}{2} CV^2$, at each actuated electrode is multiplied by the number of electrodes and the frequency of switching. The capacitance of each electrode in this case is 0.12 pF, and the switching frequency is 12 kHz. This results in an extremely small power drain of 8.8 µW.

TABLE 1

Parameters associated with EWOD peristaltic pump power calculation

| Electrode Width | 50 µm | Number of Bands | 7 (5 Plus Two at Ends sweeping) | Drive Voltage | 42 V |
|---|---|---|---|---|---|
| Electrode Length | 1 mm | Peak Band Speed | 100 mm/s | Electrostatic Energy per Electrode | 1.05 nJ |
| Channel Height | 1 µm | Average Band Speed | 60 mm/s | Total Power | 8.8 µW |

Figure 4A:
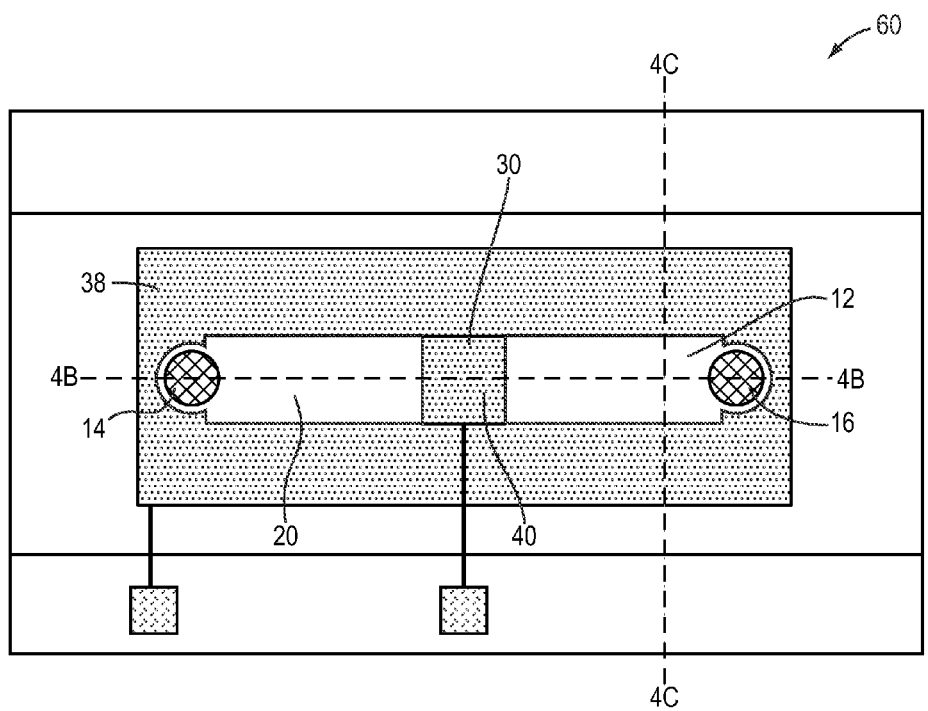
FIG. 4a is a schematic top view of a MEMS electrostatic fluidic valve, in accordance with one embodiment of the invention.
Figure 4B:
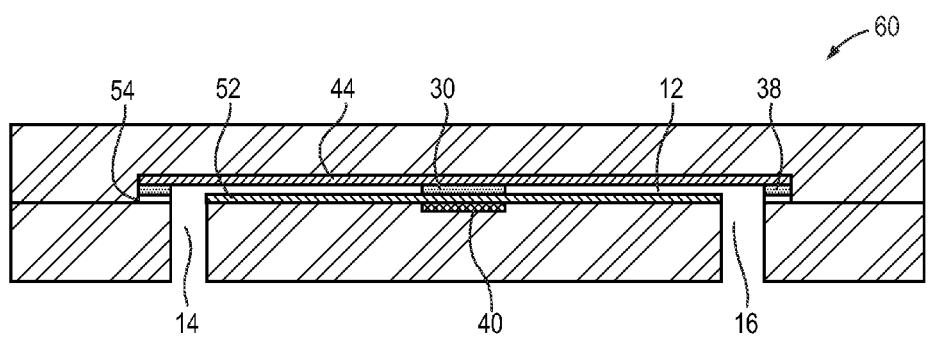
FIG. 4b is a schematic cross-sectional side view of a MEMS electrostatic fluidic valve taken along line labeled "4B'" of FIG. 4a, in accordance with one embodiment of the invention.
Figure 4C:
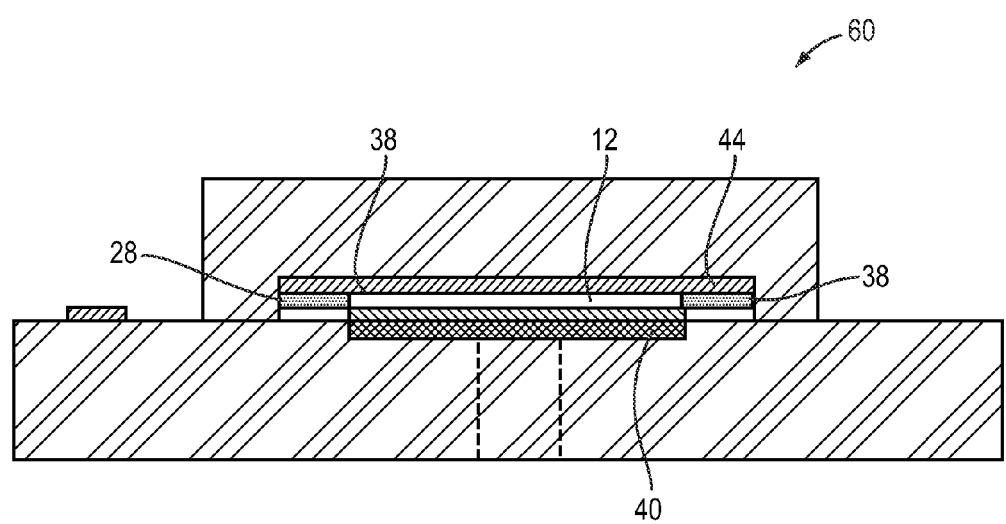
FIG. 4c is a schematic cross-sectional end view of a MEMS electrostatic fluidic valve taken along line labeled "4C'" of FIG. 4a, in accordance with one embodiment of the invention.

Referring to FIGS. 4a, 4b, and 4c, in other embodiments, the EWOD and/or EWODF principles are used to provide a MEMS electrostatic fluidic valve 60. Like the pump 10, the valve 60 includes a channel 12, an actuation electrode 40, a ground electrode 44, an inlet 14, an outlet 16, and a reservoir 38. When the valve 60 is open, the target fluid 20 is free to flow from the inlet 14, through the channel 12, and to the outlet 16. The valve 60 is closed by creating a band 30 of working fluid 28 within the channel 12. A valve that allows fluid to pass only above a pre-determined pressure can be created by varying the voltage applied to the actuation electrode 40.

As with the pump 10, the band 30 is created by applying a voltage to the actuation electrode 40. The applied voltage causes the working fluid 28 to flow from the reservoir 38 and onto the actuation electrode 40. The resulting band 30 fills the space between the actuation electrode 40 and the ground electrode 44, thereby blocking the channel 12 and preventing the target fluid 20 from flowing through the channel 12. The valve 60 is opened by turning off the voltage to the actuation electrode 40. With no applied voltage, the working fluid 28 in the band 30 de-wets the actuation electrode 40 and flows back to the reservoir 38. The actuation electrode 40 and/or ground electrode 44 may include hydrophilic or oleophilic surfaces to facilitate de-wetting. For example, with a dielectric or oil-based working fluid 28, the electrode surfaces may be oleophobic. In addition, while the depicted embodiment includes a single actuated electrode 40, multiple actuation electrodes 40 may be employed to increase the maximum holding pressure of the valve 60. Further, as described above, the reservoir 38 may include hydrophilic or oleophilic surfaces, or a charged electrode, to attract the working fluid 28.

Figure 5:
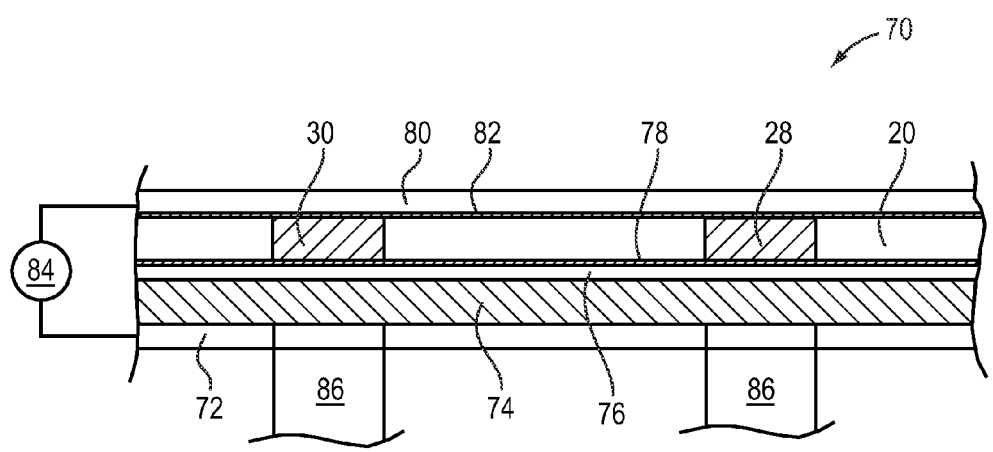
FIG. 5 is a schematic side view of a light-actuated microfluidic channel, in accordance with one embodiment of the invention.

In another embodiment, the microfluidic channel 12 is a light-actuated microfluidic channel 70 and includes one or more photosensitive materials that allow electro-wetting to be controlled by exposure to light. Referring to FIG. 5, a bottom side of the channel 70 includes a transparent electrode 72 coated with a photosensitive layer 74. The photosensitive layer 74 is coated with a first dielectric layer 76, and the first dielectric layer 76 is coated with a second dielectric layer 78. A top side of the channel 70 includes a top electrode 80, which may also be transparent. As depicted, an interior side of the top electrode 80 may be coated with a third dielectric layer 82. A power source 84 applies a voltage, such as an AC bias, between the transparent electrode 72 and the top electrode 80. The distance between the second dielectric layer 78 and the third dielectric layer 82 (i.e., a height of the channel) may be about 300 µm.

Electro-wetting within the channel 70 is controlled by shining one or more beams of light 86 through the transparent electrode 72 and onto the photosensitive layer 74. In the absence of light, a voltage drop between the two electrodes occurs mostly within the highly resistive photosensitive layer 74. Upon exposure to light, however, the electrical conductivity of the photosensitive layer 74 increases substantially (e.g., by 100× or more), and this causes the voltage drop to occur across the dielectric layers. Regions of the photosensitive layer 74 that are exposed to light become, in effect, virtual electrodes that attract and are wetted by the working fluid 28. By exposing the photosensitive layer 74 to various patterns of light, virtual electrodes of any size and shape may be created within the channel 70. Suitable light sources include lasers, light emitting diodes, fluorescent lamps, and incandescent bulbs. Lenses and/or mirrors may be used to direct the light 86 onto the photosensitive layer 74, as desired. Spatial light modulators, such as a Digital Light Processor (DLP™), available from Texas Instruments, Inc. of Dallas, Tex., or a liquid crystal projector, may be used to project a DLP image onto the photosensitive layer 74 through a series of lenses and/or mirrors. In other embodiments, particularly when the working fluid 28 is a dielectric, as described above, the channel 70 may not include the dielectric layers 76, 78, 82. In that case, upon exposure to the light 86, the voltage drop may occur primarily across the dielectric working fluid 28.

The light-actuated microfluidic channel 70 may be utilized in an electrostatic pump and/or an electrostatic valve, similar to pump 10 and valve 60, described above. In a pump application, the photosensitive layer 74 is illuminated with one or more bands of light near the pump inlet. The bands of light are then translated along the channel and eliminated or extinguished near the pump outlet. By illuminating the photosensitive layer 74 with bands of light in this manner, bands 30 of working fluid 28 are created that entrap and/or pump the target fluid 20 from the pump inlet to the pump outlet, as described above. Similarly, in a valve application, the photosensitive layer 74 is illuminated with one or more bands of light to create one or more bands 30 of working fluid 28 that block the channel 70 and close the valve.

The transparent electrode 72, the photosensitive layer 74, and the dielectric layers 76, 78, 82 may be made of any suitable materials having the desired electrical and optical properties. In one embodiment, the transparent electrode 72 is made of indium-tin-oxide. The thickness of the transparent electrode 72 may be about 300 nm, and it may be coated on a layer of glass. The transparent electrode 72 may be a single continuous electrode, or it may include a set of discrete or pixilated electrodes arranged in, for example, a grid pattern. The photosensitive layer 74 may be made of hydrogenated amorphous silicon (a-Si:H). The photosensitive layer 74 may be about 1 µm in thickness and it may be deposited onto the transparent electrode 72 by plasma-enhanced chemical vapor deposition. Upon exposure to light, the electrical conductivity of the photosensitive layer 74 may increase by more than a factor of 100. Suitable dielectric materials for the dielectric layers 76, 78, 82 include, for example, aluminum oxide, silicon dioxide, and TEFLON®. In one embodiment, the first dielectric layer 76 is a 100 nm film of aluminum oxide deposited onto the photosensitive layer 74 by atomic layer deposition. The second dielectric layer 78 and third dielectric layer 82 may be, for example, 25 nm films of TEFLON®.

As would be understood by one of ordinary skill in the art, other channel and electrode geometries are possible. For example, concentric expanding circles of working fluid may be created around an inlet to draw in and entrap the target fluid within the circles. One or more of the circles may then be translated through the channel to the outlet where the circles may be contracted to push the fluid through the outlet. The optically induced electrodes may be programmed to produce complex patterns of expanding, translating, and/or contracting rings to optimize pumping.

The EWOD and EWODF pumps described herein feature several advantages. For example, the pumps consume very low power (approximately 9 µW), as electrostatic energy is applied only to fluidic bands in motion. In addition, the driving pressure that may be achieved by the pumps is limited only by the vapor pressure of the working fluid 28. Moreover, the pumps are simple to operate and the fluid moving parts do not wear out. The pumping rates of the pumps may also be controlled electronically with precision, regardless of the target fluid gas species or composition.

As another advantage, both the EWOD and EWODF pumps may double as fluidic valves with no leakage path. As described above, there is zero backflow when a static voltage is applied to maintain the fluidic bands 30.

Embodiments of the invention may be employed in a wide variety of commercial applications. For example, the EWOD and EWODF pumps can be employed as sampling pumps for micro-analytic systems, as micro-roughing pumps for high vacuum systems, and/or as ultra small, low power pumps for portable analytic equipment (such as a mass spectrometer). Embodiments of the invention may also serve as pump and valve components for an integrated microfluidic system that includes sampling, pumping, and valving functions.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A pump, comprising:
a microfluidic channel extending between a fluid inlet and a fluid outlet;
a plurality of electrodes for electrostatically translating a target fluid, trapped between bands of a working fluid, along the channel from the fluid inlet to the fluid outlet; and
at least one liquid reservoir having a first portion positioned alongside a first side of the microfluidic channel and a second portion positioned alongside a second side of the microfluidic channel, the at least one liquid reservoir providing a return path for the working fluid and having a hydrophobicity different from a hydrophobicity of the plurality of electrodes along the microfluidic channel.

2. The pump of claim 1, wherein the plurality of electrodes comprises at least one light-actuated virtual electrode.

3. The pump of claim 1 further comprising a dielectric layer disposed upon at least one electrode.

4. The pump of claim 3, wherein the working fluid is conductive.

5. The pump of claim 1, wherein the working fluid is dielectric.

6. The pump of claim 5, wherein the working fluid is an oil.

7. The pump of claim 1 further comprising a thiol-terminated molecule disposed upon at least one electrode.

8. The pump of claim 1, wherein at least one electrode comprises a surface chemistry that attracts the working fluid when the at least one electrode is charged and that repels the working fluid when the electrode is uncharged.

9. The pump of claim 1, wherein the microfluidic channel is in fluidic communication with the at least one reservoir for the working fluid.

10. The pump of claim 9, wherein the at least one reservoir is disposed around a periphery of the plurality of electrodes.

11. The pump of claim 1, wherein the target fluid is a gas.

12. The micro pump of claim 1, wherein the first portion of the at least one liquid reservoir positioned alongside the first side of the microfluidic channel is in fluid communication with the second portion of the at least one liquid reservoir positioned alongside the second side of the microfluidic channel, such that the at least one liquid reservoir substantially surrounds the microfluidic channel.

13. A method of translating a target fluid along a microfluidic channel extending between a fluid inlet and a fluid outlet, the method comprising:
sequentially actuating a set of electrodes in proximity to the microfluidic channel, thereby electrostatically translating bands of a working fluid and target fluid trapped therebetween from the fluid inlet to the fluid outlet; and
returning the working fluid from a region proximate the fluid outlet to a region proximate the fluid inlet through at least one liquid reservoir having a first portion positioned alongside a first side of the microfluidic channel and a second portion positioned alongside a second side of the microfluidic channel, the at least one liquid reservoir having a hydrophobicity different from a hydrophobicity of the plurality of electrodes along the microfluidic channel.

14. The method of claim 13, wherein the actuating step comprises illuminating a photosensitive layer with light to actuate a virtual electrode.

15. The method of claim 13, wherein a dielectric layer is disposed upon at least one electrode.

16. The method of claim 15, wherein the working fluid is conductive.

17. The method of claim 13, wherein the working fluid is dielectric.

18. The method of claim 17, wherein the working fluid is an oil.

19. The method of claim 13, wherein a thiol-terminated molecule is disposed upon at least one electrode.

20. The method of claim 13, wherein at least one electrode comprises a surface chemistry that attracts the working fluid when the at least one electrode is actuated and that repels the working fluid when the electrode is de-actuated.

21. The method of claim 13, wherein the target fluid is a gas.

22. The method of claim 13, wherein the first portion of the at least one liquid reservoir positioned alongside the first side of the microfluidic channel is in fluid communication with the second portion of the at least one liquid reservoir positioned alongside the second side of the microfluidic channel, such that the at least one liquid reservoir substantially surrounds the microfluidic channel.

\* \* \* \* \*